US012600238B2

(12) United States Patent
Lim et al.

(10) Patent No.: US 12,600,238 B2
(45) Date of Patent: Apr. 14, 2026

(54) VEHICLE AND CONTROL METHOD THEREOF

(71) Applicants:Hyundai Motor Company, Seoul (KR); KIA CORPORATION, Seoul (KR)

(72) Inventors: Kyung Hyun Lim, Hanam-Si (KR); Sang Jin Lee, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 212 days.

(21) Appl. No.: 18/220,417

(22) Filed: Jul. 11, 2023

(65) Prior Publication Data

US 2024/0149692 A1     May 9, 2024

(30) Foreign Application Priority Data

Nov. 4, 2022     (KR) ......................... 10-2022-0146312

(51) Int. Cl.
| | |
|---|---|
| *B60L 3/00* | (2019.01) |
| *B60L 58/10* | (2019.01) |
| *H02J 7/00* | (2006.01) |

(52) U.S. Cl.
CPC ............. *B60L 3/0046* (2013.01); *B60L 58/10* (2019.02); *H02J 7/0068* (2013.01)

(58) Field of Classification Search
CPC .......... B60L 3/0046; B60L 58/10; B60L 3/12; B60L 2240/547; B60L 2240/549; B60L 50/60; B60L 58/12; B60L 58/14; B60L 58/20; B60L 58/16; B60L 58/18; H02J 7/0068; H02J 7/00; Y02T 10/70; Y02T 10/7072; B60Y 2200/91; B60Y 2400/112
See application file for complete search history.

(56) References Cited

U.S. PATENT DOCUMENTS

| | | | |
|---|---|---|---|
| 11,124,083 B2 | 9/2021 | Jang et al. | |
| 11,143,710 B2 | 10/2021 | Mitsuyama et al. | |
| 2015/0149014 A1 | 5/2015 | Kees et al. | |
| 2016/0288651 A1* | 10/2016 | Kinoshita | B60L 7/10 |
| 2022/0009376 A1* | 1/2022 | Kawai | B60L 50/66 |
| 2023/0055691 A1* | 2/2023 | Nezuka | G01R 15/246 |
| 2024/0030803 A1* | 1/2024 | Kazaoka | H02M 1/14 |

FOREIGN PATENT DOCUMENTS

| | | |
|---|---|---|
| CN | 109073708 B | 7/2021 |
| JP | 2007-261433 A | 10/2007 |
| KR | 2012-0012522 A | 2/2012 |
| KR | 20200075929 A | 6/2020 |
| KR | 2021-0028991 A | 3/2021 |
| KR | 2022-0073891 A | 6/2022 |

* cited by examiner

*Primary Examiner* — Michael C Zarroli
(74) *Attorney, Agent, or Firm* — Banner & Witcoff, Ltd.

(57) ABSTRACT

A vehicle may include: an auxiliary battery configured to supply power to the vehicle; a low-voltage output unit configured to supply power to the auxiliary battery to charge the auxiliary battery; a battery sensor configured to measure a current of the auxiliary battery by charging or discharging the auxiliary battery; and a controller configured to control the low-voltage output unit, and determine a durability of the auxiliary battery based on an internal resistance, of the auxiliary battery, calculated using the current measured by the battery sensor.

19 Claims, 4 Drawing Sheets

VEHICLE AND CONTROL METHOD THEREOF

CROSS-REFERENCE TO RELATED APPLICATION

This application is based on and claims priority to Korean Patent Application No. 10-2022-0146312, filed on Nov. 4, 2022 in the Korean Intellectual Property Office, the disclosure of which is incorporated herein by reference.

TECHNICAL FIELD

The disclosure relates to a vehicle and a control method thereof, and more specifically, to a vehicle and a control method thereof identifying an error in an auxiliary battery installed in an electric vehicle.

BACKGROUND

Green vehicles may include an electric vehicle, a hybrid vehicle, a plug-in hybrid vehicle, a fuel cell vehicle, and the like. Such a green vehicle is driven using an electric motor, and a main battery for supplying power to the electric motor is mounted in the vehicle. Also, an auxiliary battery for starting and supplying power to headlights, wipers, and the like, may be additionally mounted in a green vehicle.

Because a state of charge (SoC) of a main battery that supplies high-voltage power to an electric motor is typically displayed on a dashboard information panel, a user may frequently check the state of the main battery. However, because an auxiliary battery plays only an auxiliary role at the beginning stage of operating an electric vehicle, and the auxiliary battery may be overused past its expected lifespan.

In conventional internal combustion engine vehicles, because an engine would simply fail to start if a battery is used past its expected lifespan, the battery of an internal combustion engine vehicle is more likely to be replaced. In electric vehicles, however, even when an auxiliary battery is overused or a failure occurs in the auxiliary battery, a state of the auxiliary battery may not be accurately identified.

SUMMARY

An aspect of the disclosure provides a vehicle and a control method thereof that may identify whether an error occurs in an auxiliary battery installed in an electric vehicle.

Additional aspects of the disclosure will be set forth in part in the description which follows and, in part, will be obvious from the description, or may be learned by practice of the disclosure.

According to one or more embodiments of the present disclosure, a vehicle may include an auxiliary battery configured to supply power to the vehicle; a low-voltage output unit configured to supply power to the auxiliary battery to charge the auxiliary battery; a battery sensor configured to measure a current of the auxiliary battery by charging or discharging the auxiliary battery; and a controller configured to: control the low-voltage output unit, and determine a durability of the auxiliary battery based on an internal resistance, of the auxiliary battery, calculated using the current measured by the battery sensor.

The controller may be further configured to control the low-voltage output unit to supply a sine wave current to the auxiliary battery so that the auxiliary battery is charged or discharged for calculation of the internal resistance of the auxiliary battery.

The controller may be further configured to calculate the internal resistance of the auxiliary battery based on a change in the measured current of the auxiliary battery. The change in the measured current may be generated by the sine wave current supplied by the low-voltage output unit.

The controller may be further configured to calculate the internal resistance of the auxiliary battery based on a frequency of the sine wave current supplied by the low-voltage output unit.

The controller may be further configured to, based on the internal resistance being increased under a condition that the frequency of the sine wave current being greater than or equal to a threshold frequency, control the low-voltage output unit to lower a charging voltage being supplied to the auxiliary battery.

The controller may be further configured to, based on the internal resistance being increased under a condition that the frequency of the sine wave current being less than or equal to a threshold frequency, and based on the auxiliary battery being charged and discharged more than a threshold number of times, control the low-voltage output unit to lower a charging voltage being supplied to the auxiliary battery.

The controller may be further configured to, based on the internal resistance being increased under a condition that the frequency of the sine wave current is less than or equal to a frequency threshold, and based on the auxiliary battery being charged and discharged less than a threshold number of times, control the low-voltage output unit to raise a charging voltage being supplied to the auxiliary battery.

The controller may be configured to determine the durability of the auxiliary battery after supplementary charging of the auxiliary battery is performed.

The controller may be configured to determine the durability of the auxiliary battery a predetermined period of time after the supplementary charging of the auxiliary battery is performed.

According to one or more example embodiments of the present disclosure, a method may include: controlling, by a controller, a low-voltage output unit to supply a sine wave current to an auxiliary battery of a vehicle so that the auxiliary battery is charged or discharged; measuring, using a battery sensor, a change in a current amount of the auxiliary battery generated by the sine wave current supplied to the auxiliary battery; calculating, by the controller, an internal resistance of the auxiliary battery based on the change in the current amount, of the auxiliary battery, measured by the battery sensor; and controlling, by the controller and based on the internal resistance of the auxiliary battery being greater than or equal to a threshold value, the low-voltage output unit to adjust a charging voltage being supplied to the auxiliary battery.

The change in the current amount of the auxiliary battery may be based on a frequency of the sine wave current supplied by the low-voltage output unit.

Controlling of the low-voltage output unit to adjust the charging voltage being supplied to the auxiliary battery may include controlling, based on the internal resistance being increased under a condition that the frequency of the sine wave current being greater than or equal to a frequency threshold, the low-voltage output unit to lower the charging voltage being supplied to the auxiliary battery.

Controlling of the low-voltage output unit to adjust the charging voltage being supplied to the auxiliary battery may include controlling, based on the internal resistance being increased under a condition that the frequency of the sine wave current being less than or equal to a frequency threshold, and based on the auxiliary battery being charged and discharged more than a predetermined number of times, the low-voltage output unit to lower the charging voltage being supplied to the auxiliary battery.

Controlling of the low-voltage output unit to adjust the charging voltage being supplied to the auxiliary battery may include controlling, based on the internal resistance being increased under a condition that the frequency of the sine wave current being less than or equal to a frequency threshold, and based on the auxiliary battery being charged and discharged less than a predetermined number of times, the low-voltage output unit to raise the charging voltage being supplied to the auxiliary battery.

The method may further include: controlling, by the controller and before the controlling of the low-voltage output unit to supply the sine wave current to the auxiliary battery, the low-voltage output unit to supply power to the auxiliary battery for supplementary charging of the auxiliary battery.

The method may further include: determining whether a stabilization time has elapsed after the supplementary charging of the auxiliary battery is completed. Controlling of the low-voltage output unit to supply the sine wave current to the auxiliary battery may be performed based on the stabilization time being greater than or equal to a predetermined period of time.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
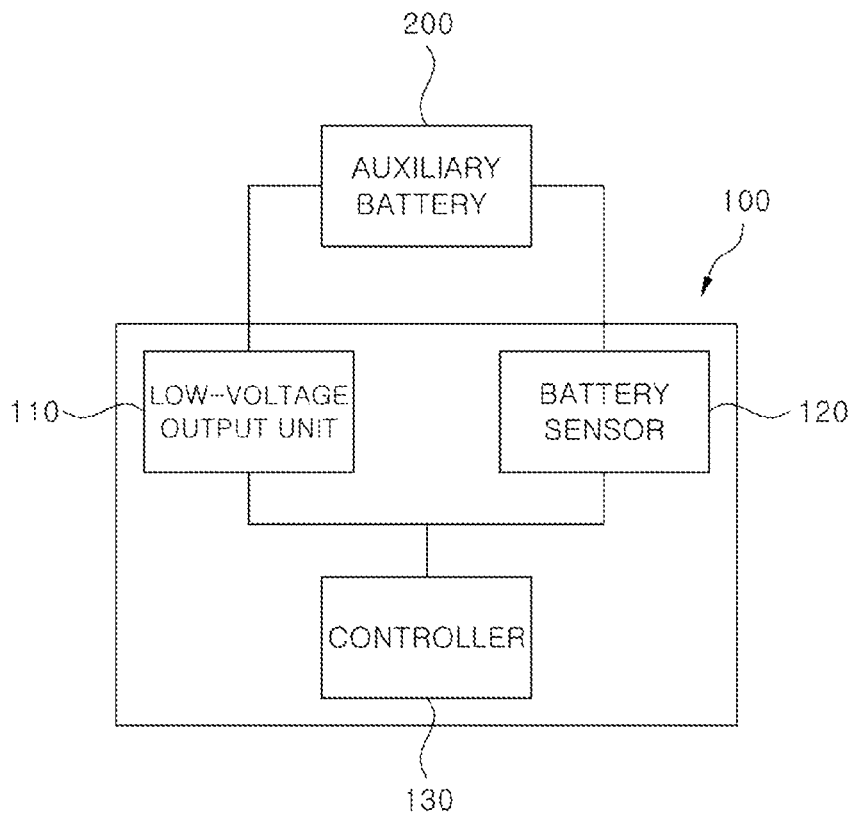
FIG. 1 is a diagram illustrating an auxiliary battery durability analysis device of a vehicle.

Hereinafter, one or more embodiments will be described in detail with reference to the accompanying drawings. The embodiments disclosed below are illustrative of the technical idea of the disclosure, and those skilled in the art will appreciate that various modifications, changes, and substitutions may be made without departing from the essential characteristics thereof. Parts irrelevant to description are omitted in the drawings in order to clearly explain embodiments. In the drawings, a width, length, thickness, and like of constituent components may be exaggerated for convenience. Like reference numerals throughout the specification denote like elements.

Figure 2:
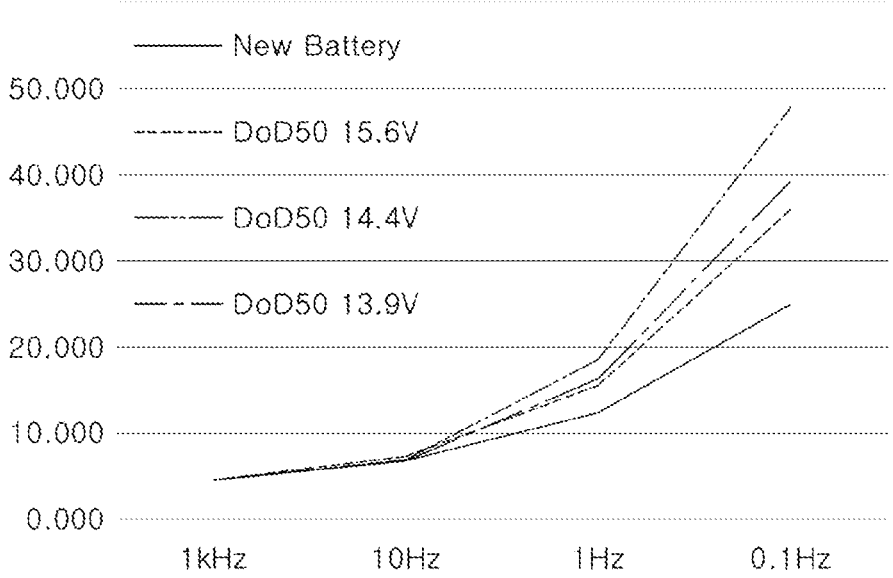
FIG. 2 is a graph illustrating a result of a durability test of depth of discharge (DoD) 50%, in an auxiliary battery durability analysis device of a vehicle.
Figure 3:
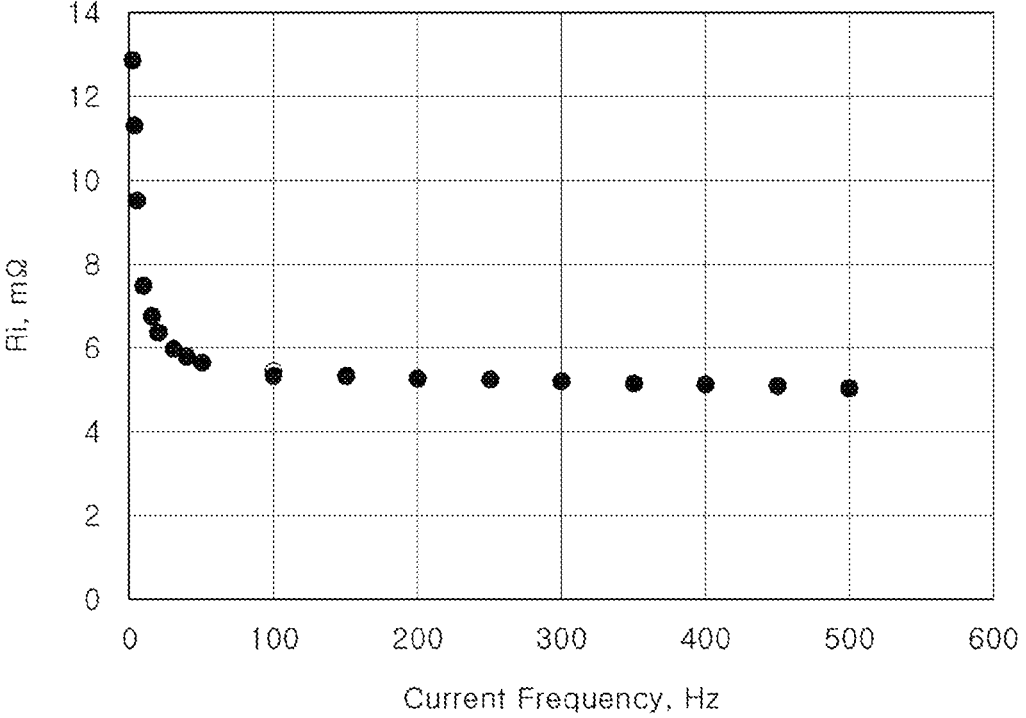
FIG. 3 is a graph illustrating a result of measuring an internal resistance in an auxiliary battery durability analysis device of a vehicle.
Figure 4:
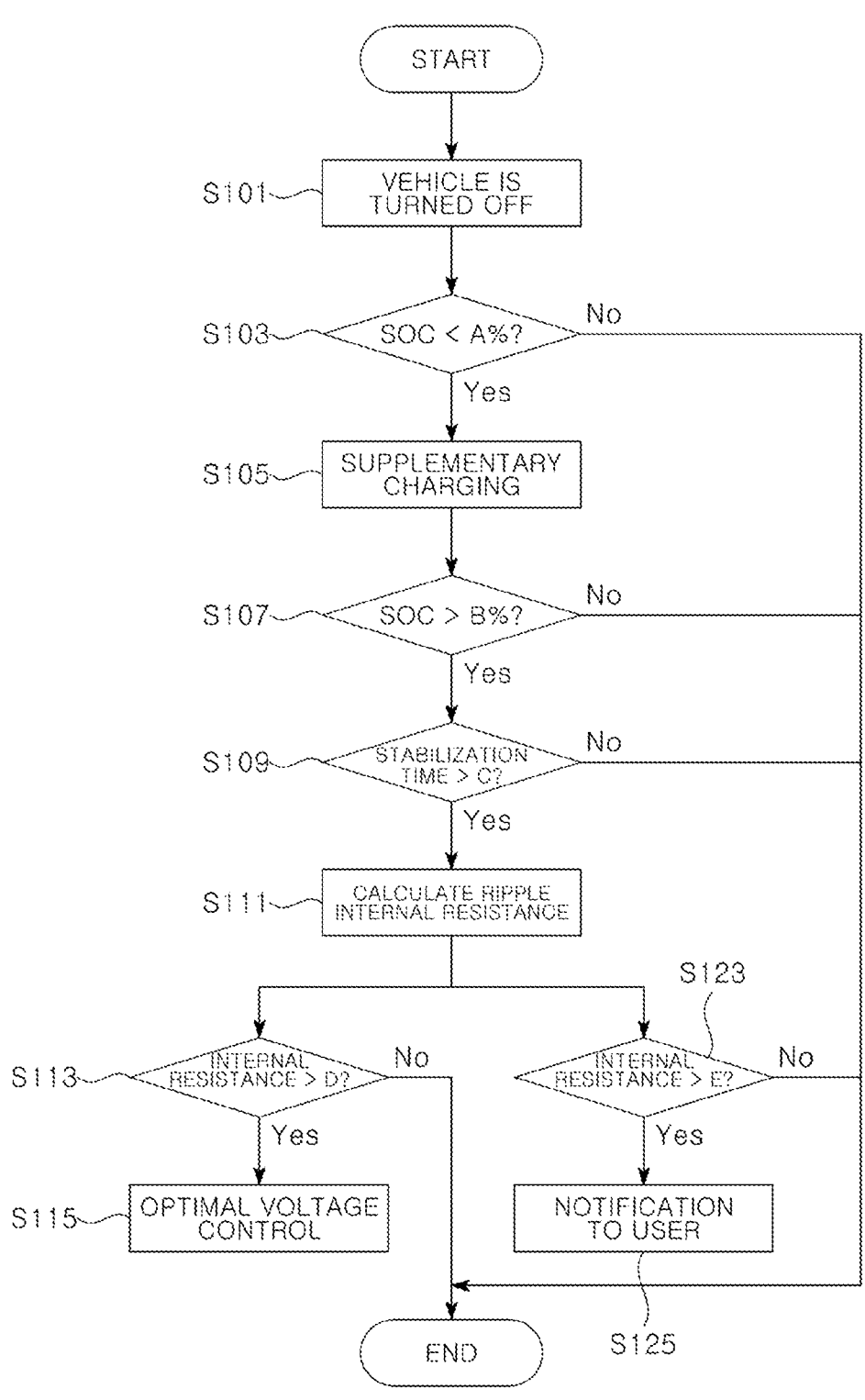
FIG. 4 is a flowchart illustrating a control method of a vehicle.

Referring to FIG. 1, FIG. 2 and FIG. 3, an auxiliary battery durability analysis device 100 of a vehicle is described. The auxiliary battery durability analysis device 100 includes a low-voltage output unit 110, a battery sensor 120 and a controller 130.

The low-voltage output unit 110 steps down a voltage to supply an auxiliary battery 200 with power of a high-voltage main battery installed in an electric vehicle. The auxiliary battery 200 has a voltage relatively lower than the main battery, and the low-voltage output unit 110 lowers a voltage of the high-voltage main battery to match the voltage of the auxiliary battery 200.

The battery sensor 120 measures a current of the auxiliary battery 200 and calculates an average value. An intelligent battery sensor (IBS) may be used as the battery sensor 120. The battery sensor 120 may detect a state of charge (SoC) of the auxiliary battery 200 by measuring the current of the auxiliary battery 200.

The controller 130 analyzes durability of the auxiliary battery 200 using the battery sensor 120, and determines whether an error occurs in the auxiliary battery 200 due to softening and falling-off phenomenon of an active material. Also, the controller 130 may control the low-voltage output unit 110 so that a voltage of power charged in the auxiliary battery 200 is optimized, and control a notification device (not shown) for notifying a user of an error in the auxiliary battery 200.

Here, the softening and falling-off phenomenon of the active material refers to a softening phenomenon in which a binding force of the active material is gradually weakened and the active material falls off due to repeated reactions.

More specifically, during deep (e.g., complete or near-complete) discharge of the auxiliary battery 200 using lead acid, when ions dissolved in a chemical reaction turn into lead sulfate (PbSo4), a phenomenon in which the ions are accumulated in a separated state without being adsorbed during suspension occurs. In addition, if the auxiliary battery 200 is charged after being discharged, as reactants are not all reduced and a portion of the reactants are changed to passive lead sulfate, the softening phenomenon in which a binding force of active material is gradually weakened occurs, and a falling-off phenomenon of the active material may occur due to repeated softening phenomenon.

The controller 130 may confirm a singular point of durability of the auxiliary battery 200 through frequency-specific analysis of durability. In this instance, the controller 130 analyzes the durability of the auxiliary battery 200 by a durability test of depth of discharge (DoD) 50%. The DoD test is a test for full charge and full discharge (e.g., a depth of discharge of the auxiliary battery 200), and, for example, DoD 50% may refer to a test for analyzing durability while discharging the auxiliary battery 200 by 50%. In the test, the durability by frequency is analyzed by varying limit durability differently (e.g., changing the auxiliary battery 200 to a new battery and changing a charging voltage to 15.6 V, 14.4 V and 13.9 V). Results shown in the table 1 below are derived, and the results may be displayed as a graph shown in FIG. 2.

| | DoD50 Limit durability | Full charge capacity | Reduction in capacity | Internal resistance [1 kHz] | Frequency internal resistance | | | |
|---|---|---|---|---|---|---|---|---|
| | | | | | 1 kHz | 10 Hz | 1 Hz | 0.1 Hz |
| New Battery | — | 62.442 | — | 4.71 | 4.688 | 6.942 | 12.298 | 24.913 |

-continued

| | DoD50 Limit | Full charge | Reduction in | Internal resistance | Frequency internal resistance | | | |
|---|---|---|---|---|---|---|---|---|
| | durability | capacity | capacity | [1 kHz] | 1 kHz | 10 Hz | 1 Hz | 0.1 Hz |
| 15.6 V | 39 | 41.995 | −20.45 | 4.49 | 4.450 | 7.303 | 15.478 | 35.910 |
| 14.4 V | 24 | 52.614 | −9.83 | 4.47 | 4.466 | 6.860 | 18.480 | 47.746 |
| 13.9 V | 17 | 48.888 | −13.55 | 4.44 | 4.474 | 6.743 | 16.192 | 39.245 |

As a result of testing the durability of the auxiliary battery 200, it may be confirmed that a low-frequency internal resistance tends to increase at 0.1 Hz and a softening mode is in progress through decomposition analysis.

Also, the controller 130 may measure an internal resistance of the auxiliary battery 200 through the battery sensor 120. In this instance, the controller 130 may measure the internal resistance by using a ripple component of voltage and current. In an internal combustion engine vehicle, an internal resistance of the auxiliary battery 200 is measured using a starting waveform. However, because a starting waveform is not present in an electric vehicle, the controller 130 may measure the internal resistance of the auxiliary battery 200 using the ripple component of current measured by the battery sensor 120.

For example, the controller 130 may measure a ripple internal resistance with respect to a frequency of the current, by charging the auxiliary battery 200 with a current between 0 A and 10 A and discharging the auxiliary battery 200 with a current between 0 A and 10 A again. The controller 130 may apply a current for charging the auxiliary battery 200 in a sine wave to charge and discharge the auxiliary battery 200, thereby measuring the ripple internal resistance of the auxiliary battery 200. The ripple internal resistance is a low-frequency internal resistance, has a correlation with durability, and may be used to calculate the internal resistance based on an average fluctuation range of ripple waveforms of voltage and current.

Accordingly, as shown in FIG. 3, the internal resistance of the auxiliary battery 200 may be measured in a range of current frequency for charging and discharging between 1 Hz and 500 Hz. Through the above, the internal resistance may be calculated up to a low frequency, and it may be confirmed that the internal resistance of the auxiliary battery 200 increases as the frequency decreases. It may also be confirmed that a correlation factor for low frequency decreases. Here, the frequency range of current may extend to 500 Hz from 0.1 Hz.

Accordingly, after a supplementary charging logic is performed by controlling the frequency of current, the low-voltage output unit 110 may perform low-frequency charging in the same charging state. Here, the supplementary charging is performed to replenish a capacity consumed by self-discharge or during use. The supplementary charging may be performed if charging is not sufficiently done, electricity usage is excessive, short-circuit occurs, or the like. Also, the supplementary charging may be performed as one of constant current charging, constant voltage charging, stage-by-stage current charging, and rapid charging.

For example, if a high-frequency internal resistance of the auxiliary battery 200 increases through the battery sensor 120, the controller 130 may control the low-voltage output unit 110 to lower a charging voltage to reduce damage applied to the auxiliary battery 200 and to reinforce durability. For instance, if a normal charging voltage is 14.3V, the controller 130 may control to lower the charging voltage of 14.3V to 14.0V to reinforce durability. The increase in high-frequency internal resistance of the auxiliary battery 200 may be caused by mechanical corrosion of an electrode plate inside the battery or by a state transition of electrolyte solution.

Furthermore, if a low-frequency internal resistance of the auxiliary battery 200 increases, the controller 130 may divide the above increase into two cases described below to control charging of the auxiliary battery 200. In one of the two cases, an active material is aged by excessive charging and discharging due to frequent driving, and in the other case, reactivity is reduced by insufficient charging and discharging due to a long parking time. In the case of aged active material, the controller 130 may control the low-voltage output unit 110 to lower a charging voltage to reduce damage of the auxiliary battery 200, and in the case of reduced reactivity, the controller 130 may control the low-voltage output unit 110 to increase a charging voltage to increase an activity of active material. For example, in the case of aged active material, if a normal charging voltage is 14.3 V, the controller 130 may control to lower the charging voltage to 13.8 V, and in the case of reduced reactivity, if a normal charging voltage is 14.3 V, the controller 130 may control the low-voltage output unit 110 to increase the charging voltage to 15.4 V.

The above-described controller 130 analyzes durability of the auxiliary battery 200 in a state where the vehicle is turned off, and analyzes durability of the auxiliary battery 200 after the supplementary charging is performed depending on a charging state of the auxiliary battery 200. Durability analysis performed before the supplementary charging may cause a decrease in reliability of durability analysis.

Also, the controller 130 analyzes the durability of the auxiliary battery 200 after a predetermined stabilization time following the supplementary charging. However, if the stabilization time is insufficient, the reliability of durability analysis may be reduced due to non-uniform specific gravity.

With reference to FIG. 1, FIG. 2, FIG. 3 and FIG. 4, a control method of a vehicle is described.

A vehicle is turned off (S101).

In a state where the vehicle is turned off, the controller 130 performs durability analysis of the auxiliary battery 200. In a state where the vehicle is turned on, the auxiliary battery 200 may be charged or discharged, and thus a SoC of the auxiliary battery 200 may be changed during charging and discharging. Accordingly, the durability analysis of the auxiliary battery 200 is performed while the vehicle is turned off.

Whether the SoC of the auxiliary battery 200 is less than a predetermined amount (A %) is confirmed (S103).

The controller 130 confirms whether the SoC of the auxiliary battery 200 is less than the predetermined amount (A %). Because durability analysis performed before a supplementary charging may cause a decrease in reliability of durability analysis, the controller 130 confirms whether the SoC of the auxiliary battery 200 is less than the predetermined amount (A %) in order to perform the supplementary charging.

The supplementary charging is performed (S105).

As the SoC of the auxiliary battery 200 is less than the predetermined amount (A %), the controller 130 controls the low-voltage output unit 110 to perform the supplementary charging of the auxiliary battery 200. The supplementary charging is performed to replenish a capacity consumed by self-discharge or during use. The supplementary charging may be performed if charging is not sufficiently done, electricity usage is excessive, short-circuit occurs, or the like.

Whether the SoC of the auxiliary battery 200 is greater than a predetermined amount (B %) is determined (S107).

The controller 130 confirms whether the SoC of the auxiliary battery 200 is greater than the predetermined amount (B %). If the SoC of the auxiliary battery 200 is lower than the predetermined amount (B %), reliability of durability analysis of the auxiliary battery 200 is reduced, and thus whether the SoC of the auxiliary battery 200 is greater than the predetermined amount (B %) is confirmed.

Whether a stabilization time of the auxiliary battery 200 is greater than a predetermined period of time C is confirmed (S109).

The controller 130 confirms whether the predetermined period of time C has elapsed after the supplementary charging of the auxiliary battery 200 is completed. As the predetermined period of time C has elapsed, the auxiliary battery 200 may have the stabilization time after charged through the supplementary charging. If the stabilization time is insufficient, the reliability of durability analysis may be reduced due to non-uniform specific gravity.

A ripple internal resistance is calculated (S111).

The controller 130 controls the low-voltage output unit 110 to perform low-frequency charging on the auxiliary battery 200, and calculates the ripple internal resistance of the auxiliary battery 200. That is, the controller 130 controls the low-voltage output unit 110 to supply a current for charging the auxiliary battery 200 in a sine wave, and calculate the internal resistance using a ripple component of the auxiliary battery 200. That is, the controller 130 continuously increases the current from 0 A to 10 A to the auxiliary battery 200, and then continuously decreases to OA again, to charge the auxiliary battery 200. The controller 130 continuously increases discharging of the auxiliary battery 200 from 0 A to −10 A, and then continuously decreases discharging of the auxiliary battery 200 to 0 A again. Also, the controller 130 calculates the internal resistance of the auxiliary battery 200 by using the ripple component of the auxiliary battery 200. Although it is illustrated in FIG. 3 that the internal resistance by frequency in a range of 1 Hz to 500 Hz is measured, the range may be extended to a range of 0.1 Hz to 500 Hz.

Whether the calculated internal resistance is greater than a predetermined value D is confirmed (S113).

Whether the internal resistance calculated in operation S111 is partially increased is confirmed. If the calculated internal resistance is not greater than the predetermined value D, it is determined that no error in durability of the auxiliary battery 200 exists, and operations end.

If the internal resistance is greater than the predetermined value D, an optimal voltage control is performed (S115).

If it is confirmed in operation S113 that the internal resistance partially increases, the controller 130 controls the low-voltage output unit 110 to perform the optimal voltage control for the auxiliary battery 200.

For example, if a high-frequency internal resistance of the auxiliary battery 200 increases through the battery sensor 120, the controller 130 may control the low-voltage output unit 110 to lower a charging voltage to reduce damage applied to the auxiliary battery 200 and to reinforce durability. For instance, if a normal charging voltage is 14.3 V, the controller 130 may control to lower the charging voltage of 14.3 V to 14.0 V to reinforce durability. The increase in high-frequency internal resistance of the auxiliary battery 200 may be caused by mechanical corrosion of an electrode plate inside the battery or by a state transition of electrolyte solution.

Furthermore, if a low-frequency internal resistance of the auxiliary battery 200 increases, the controller 130 may divide the above increase into two cases described below to control charging of the auxiliary battery 200. In one of the two cases, an active material is aged by excessive charging and discharging due to frequent driving, and in the other case, reactivity is reduced by insufficient charging and discharging due to a long parking time. In the case of aged active material, the controller 130 may control the low-voltage output unit 110 to lower a charging voltage to reduce damage of the auxiliary battery 200, and in the case of reduced reactivity, the controller 130 may control the low-voltage output unit 110 to increase a charging voltage to increase an activity of active material. For example, in the case of aged active material, if a normal charging voltage is 14.3 V, the controller 130 may control to lower the charging voltage to 13.8 V, and in the case of reduced reactivity, if a normal charging voltage is 14.3 V, the controller 130 may control the low-voltage output unit 110 to increase the charging voltage to 15.4 V.

Whether the calculated internal resistance is greater than a predetermined value E is confirmed (S123).

Whether the internal resistance calculated in operation S111 excessively increases is confirmed. If the calculated internal resistance is not greater than the predetermined value E, it is determined that no error in durability of the auxiliary battery 200 exists, and operations end. Here, the predetermined value D in operation S113 is smaller than the predetermined value E in operation S123. That is, whether the calculated internal resistance excessively increases is confirmed in operation S123.

A notification is performed to a User (S125).

If it is determined in operation S123 that the internal resistance excessively increases, the controller 130 determines that power stability of the auxiliary battery 200 may not be secured, and controls to perform a notification operation for making a user to visit to a service center for replacement or repair of the auxiliary battery 200. In this instance, the controller 130 may control a speaker or a display of a vehicle to perform the notification operation.

As is apparent from the above, according to the one or more embodiments of the disclosure, durability of an auxiliary battery can be measured by confirming a state of the auxiliary battery, thereby securing additional durability of the auxiliary battery.

According to the embodiments of the disclosure, loss of auxiliary power due to an end of a lifespan of an auxiliary battery during driving of an electric vehicle can be prevented.

What is claimed is:

1. A vehicle comprising:

an auxiliary battery configured to supply power to the vehicle;

a low-voltage output unit configured to supply power to the auxiliary battery to charge the auxiliary battery;

a battery sensor configured to measure a current of the auxiliary battery by charging or discharging the auxiliary battery; and a controller configured to:

control the low-voltage output unit to supply, to the auxiliary battery, a current of a predetermined frequency; and determine a durability of the auxiliary battery based on a characteristic of an internal resistance, of the auxiliary battery, corresponding to the predetermined frequency, wherein the internal resistance is calculated using the current measured by the battery sensor.

2. The vehicle of claim 1, wherein the controller is further configured to control the low-voltage output unit to supply a sine wave current to the auxiliary battery so that the auxiliary battery is charged or discharged for calculation of the internal resistance of the auxiliary battery.

3. The vehicle of claim 2, wherein the controller is further configured to calculate the internal resistance of the auxiliary battery based on a change in the measured current of the auxiliary battery, and wherein the change in the measured current is generated by the sine wave current supplied by the low-voltage output unit.

4. The vehicle of claim 2, wherein the controller is further configured to calculate the internal resistance of the auxiliary battery based on a frequency of the sine wave current supplied by the low-voltage output unit.

5. The vehicle of claim 4, wherein the controller is further configured to, based on the internal resistance being increased under a condition that the frequency of the sine wave current being greater than or equal to a threshold frequency, control the low-voltage output unit to lower a charging voltage being supplied to the auxiliary battery.

6. The vehicle of claim 4, wherein the controller is further configured to, based on the internal resistance being increased under a condition that the frequency of the sine wave current being less than or equal to a threshold frequency, and based on the auxiliary battery being charged and discharged more than a threshold number of times, control the low-voltage output unit to lower a charging voltage being supplied to the auxiliary battery.

7. The vehicle of claim 4, wherein the controller is further configured to, based on the internal resistance being increased under a condition that the frequency of the sine wave current being less than or equal to a frequency threshold, and based on the auxiliary battery being charged and discharged less than a threshold number of times, control the low-voltage output unit to raise a charging voltage being supplied to the auxiliary battery.

8. The vehicle of claim 1, wherein the controller is configured to determine the durability of the auxiliary battery after supplementary charging of the auxiliary battery is performed.

9. The vehicle of claim 8, wherein the controller is configured to determine the durability of the auxiliary battery a predetermined period of time after the supplementary charging of the auxiliary battery is performed.

10. A method comprising:

controlling, by a controller, a low-voltage output unit to supply a sine wave current, of a predetermined frequency, to an auxiliary battery of a vehicle;

measuring, using a battery sensor, a change in a current amount of the auxiliary battery generated by the sine wave current supplied to the auxiliary battery;

based on the change in the current amount measured by the battery sensor, calculating, by the controller, a characteristic of an internal resistance, of the auxiliary battery, corresponding to the predetermined frequency; and controlling, by the controller and based on the characteristic of the internal resistance of the auxiliary battery, the low-voltage output unit to adjust a charging voltage being supplied to the auxiliary battery.

11. The method of claim 10, wherein the change in the current amount of the auxiliary battery is based on a frequency of the sine wave current supplied by the low-voltage output unit.

12. The method of claim 11, wherein the controlling of the low-voltage output unit to adjust the charging voltage being supplied to the auxiliary battery comprises controlling, based on the internal resistance being increased under a condition that the frequency of the sine wave current being greater than or equal to a frequency threshold, the low-voltage output unit to lower the charging voltage being supplied to the auxiliary battery.

13. The method of claim 11, wherein the controlling of the low-voltage output unit to adjust the charging voltage being supplied to the auxiliary battery comprises controlling, based on the internal resistance being increased under a condition that the frequency of the sine wave current is less than or equal to a frequency threshold, and based on the auxiliary battery being charged and discharged more than a predetermined number of times, the low-voltage output unit to lower the charging voltage being supplied to the auxiliary battery.

14. The method of claim 11, wherein the controlling of the low-voltage output unit to adjust the charging voltage being supplied to the auxiliary battery comprises controlling, based on the internal resistance being increased under a condition that the frequency of the sine wave current being less than or equal to a frequency threshold, and based on the auxiliary battery being charged and discharged less than a predetermined number of times, the low-voltage output unit to raise the charging voltage being supplied to the auxiliary battery.

15. The method of claim 10, further comprising:

controlling, by the controller and before the controlling of the low-voltage output unit to supply the sine wave current to the auxiliary battery, the low-voltage output unit to supply power to the auxiliary battery for supplementary charging of the auxiliary battery.

16. The method of claim 15, further comprising:

determining whether a stabilization time has elapsed after the supplementary charging of the auxiliary battery is completed, wherein the controlling of the low-voltage output unit to supply the sine wave current to the auxiliary battery is performed based on the stabilization time being greater than or equal to a predetermined period of time.

17. A vehicle comprising:

a battery configured to supply power to the vehicle;

a charging node configured to charge the battery;

a battery sensor configured to sense at least one battery parameter of the battery; and a control circuit configured to:

determine, based on the at least one battery parameter, a characteristic of an internal resistance of the battery, wherein the characteristic of the internal resistance is associated with a characteristic of an alternating current supplied to the battery; and generate, based on the characteristic of the internal resistance, a signal indicating a state of health of the battery, wherein the control circuit is configured to decrease or increase, based on the signal indicating the state of health of the battery, an input voltage applied to the battery, and wherein the state of health indicates a durability of the battery.

18. The vehicle of claim 17, wherein the at least one battery parameter comprises at least one of: the internal resistance, a voltage of the battery, a current of the battery, or a state of charge (SOC) of the battery.

19. The vehicle of claim 17, wherein the characteristic of the alternating current comprises at least one frequency of the alternating current, and wherein the characteristic of the internal resistance is determined based on the at least one frequency of the alternating current.

* * * * *